Reynolds & Brooks,
Bee Hive.

No. 113,207. Patented Mar. 28, 1871.

Witnesses.
Harry King.
Phil. T. Dodge

Inventors.
W. Reynolds
J. V. Brooks.
by Dodge & Munn
Atty.

N. PETERS, PHOTO-LITHOGRAPHER, WASHINGTON, D. C.

United States Patent Office.

WILLIAM REYNOLDS AND JOSEPH V. BROOKS, OF LEXINGTON, ILLINOIS.

Letters Patent No. 113,207, dated March 28, 1871.

IMPROVEMENT IN BEE-HIVES.

The Schedule referred to in these Letters Patent and making part of the same.

*To all whom it may concern:*

Be it known that we, WILLIAM REYNOLDS and JOSEPH V. BROOKS, of Lexington, in the county of McLean and State of Illinois, have invented certain Improvements in Bee-Hives, of which the following is a specification, reference being had to the accompanying drawing.

Our invention relates to an improved manner of holding the removable comb-frames in position in the hive; and It consists in providing each of the frames with two pins and suspending them thereby from notched strips secured to the sides of the hive, and in securing to the bottom of the hive a toothed strip to engage with and hold the lower sides of the frame.

Figure 1:
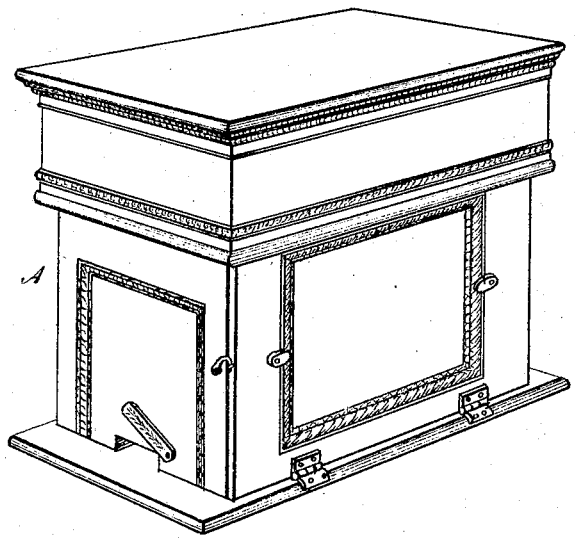
Figure 2:
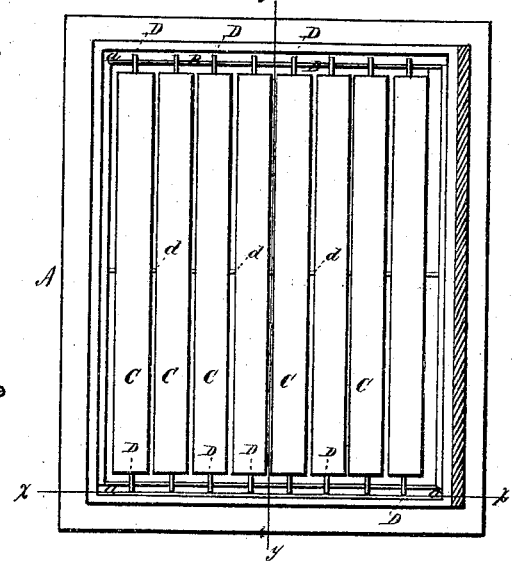
Figure 3:
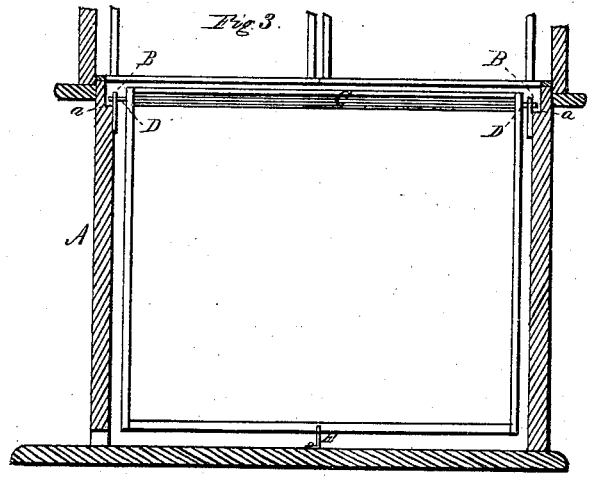

Figure 1 is a perspective view of a hive having our improvements applied;

Figure 2, a top plan view of the same with the top and honey-boxes removed;

Figure 3, a vertical section of the same on the line *y y* of fig. 2; and

Figure 4:
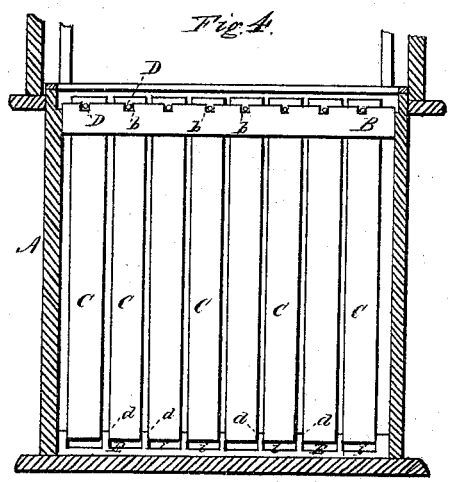

Figure 4, a section on the line *x x* of fig. 2, looking inward.

A is the body of the hive, which may be made in any one of the well-known forms, as it constitutes no part of our invention.

The upper edges of the two ends of the hive are cut away, as shown in figs. 2 and 3, so as to leave shoulders *a*.

B B are two notched strips or plates, secured one to each end of the hive, on the inside, and so as to project above the shoulders *a*.

Notches *b* are made in the upper edges of the strips, at equal distances apart, and so located that the notches in one strip are directly opposite the notches in the other, as shown in fig. 2.

C are the comb-frames, which are made of a rectangular form, and provided at each end near the upper side with a pin, D, as shown in figs. 2, 3, and 4.

These frames are suspended within the hives by setting pins D into corresponding notches in the two strips B at opposite ends of the hive, as shown in figs. 2, 3, and 4.

When thus suspended the frames are held at the same distance apart and free from contact with the case or body.

The pins D are made of such length as to extend out to and against the sides of the body so as to prevent the frames from being moved endwise and thereby brought against the sides.

E is a strip secured to the bottom of the hive, inside and at right angles to the frames C.

This strip is provided at equal distances apart, and in the proper positions, with teeth *d*, which fit up between the lower sides of the frames C and keep them from being brought in contact, and hold them at the required distance from each other.

These teeth, in connection with the pins D and strips B, thus serve to hold the comb-frames securely in position and prevent their movement in any direction; at the same time, however, the frames can be removed without hindrance by lifting them out at the top.

The bar or strip E is cut away between the teeth *d* sufficiently to allow the bees to pass under the frames between the teeth, this space being clearly shown at *i*, fig. 4.

When the parts are arranged as described it is impossible to insert the frames in other than the proper positions, and when the frames are in position it is impossible for the bees to glue or stick them fast at any point, nor is there any point within the hive where a moth-worm can conceal himself from the bees.

It is obvious that the strips B B and E may be made of any suitable material, either wood or metal, as well as the pins D D, and that the doors of the hive, instead of being hinged at the bottom, as shown in the drawing, may be hinged at the side and swing laterally.

In this way we are able to produce a hive in which the comb-frames can always be properly suspended so as to be secure against interference, but may also be handled under all circumstances with very little inconvenience or trouble.

We are aware that notched angular strips have been used at the upper end of comb-frames; also that a notched strip has been used at the bottom in connection with other means at the top, and we therefore do not claim such; but having described our invention, What we do claim is—

A bee-hive, having the notched strips B arranged at the sides, and the notched strip E at the bottom, for supporting the frames C and holding them in their proper positions, substantially as described.

WM. REYNOLDS.
JOSEPH V. BROOKS.

Witnesses:
AUGUSTUS G. WOODWARD.
SAML. B. MORRIS.